(12) United States Patent
Abney et al.

(10) Patent No.: US 7,815,744 B2
(45) Date of Patent: Oct. 19, 2010

(54) METHODS FOR MOVING A PIG THROUGH A PIPELINE USING A CHEMICAL REACTION TO GENERATE A HIGH VOLUME OF GAS

(75) Inventors: Laurence J. Abney, Katy, TX (US); Steve Arrington, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1424 days.

(21) Appl. No.: 11/000,824

(22) Filed: Nov. 30, 2004

(65) Prior Publication Data
US 2006/0115332 A1    Jun. 1, 2006

(51) Int. Cl.
*B08B 9/093* (2006.01)

(52) U.S. Cl. .................. 134/22.18; 15/104.062; 134/8; 134/22.11; 405/169

(58) Field of Classification Search .......... 134/8, 134/18, 22.1, 22.11, 22.18; 15/104.061, 15/104.062
See application file for complete search history.

(56) References Cited

U.S. PATENT DOCUMENTS

| | | | |
|---|---|---|---|
| 3,961,493 A | 6/1976 | Nolan, Jr. et al. | |
| 4,178,993 A * | 12/1979 | Richardson et al. | 166/300 |
| 4,465,104 A | 8/1984 | Wittman et al. | |
| 4,755,230 A | 7/1988 | Ashton et al. | 134/22.14 |
| 5,183,581 A | 2/1993 | Khalil et al. | 252/8.552 |
| 5,425,428 A | 6/1995 | Chatagnier, Jr. et al. | |
| 5,580,391 A | 12/1996 | Franco et al. | |
| 5,639,313 A | 6/1997 | Khalil | 134/18 |
| 5,795,402 A * | 8/1998 | Hargett et al. | 134/8 |
| 5,824,160 A | 10/1998 | Khalil et al. | |
| 5,883,303 A | 3/1999 | Bliss et al. | |
| 5,891,262 A | 4/1999 | Khalil et al. | |
| 5,927,901 A | 7/1999 | Graves | |
| 5,967,699 A | 10/1999 | Knapp | |
| 6,003,528 A | 12/1999 | De Souza et al. | |
| 6,022,421 A | 2/2000 | Bath et al. | |
| 6,109,829 A | 8/2000 | Cruickshank | |
| 6,539,778 B2 | 4/2003 | Tucker et al. | |
| 6,651,744 B1 | 11/2003 | Crawford | |
| 6,668,943 B1 | 12/2003 | Maus et al. | |

* cited by examiner

*Primary Examiner*—Michael Kornakov
*Assistant Examiner*—Eric Golightly
(74) *Attorney, Agent, or Firm*—Robert A. Kent; Booth Albanesi Schroeder LLC

(57) ABSTRACT

The invention provides a method of moving a pig through pipeline, the method comprising the steps of: a) introducing the pig into the pipeline; b) causing a chemical reaction between two or more reagents to produce at least one reaction product that would be in a gaseous state at STP, wherein the reagents would be in a non-gaseous state at STP; and c) introducing the gaseous reaction product into the pipeline. The invention also provides a method of moving a pig through a pipeline, the method comprising the steps of: a) introducing the pig into the pipeline; b) introducing into the pipeline two or more reagents capable of chemically reacting to produce at least one reaction product that would be in a gaseous state at STP, wherein the reagents would be in a non-gaseous state at STP.

20 Claims, 5 Drawing Sheets

METHODS FOR MOVING A PIG THROUGH A PIPELINE USING A CHEMICAL REACTION TO GENERATE A HIGH VOLUME OF GAS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The invention generally relates to improved methods for transporting a pig along the interior of a pipeline, particularly but not exclusively a subsea pipeline.

BACKGROUND OF THE INVENTION

There are many applications associated with the development of subsea oil and/or gas fields where the flowlines or pipelines must be "pigged" between subsea wells or templates and the product-receiving "host" facility. A "pig," or pipeline inspection gauge, describes any of a variety of objects with sealing discs or full bore devices that are moved through a pipeline. Some types of pigs, known at times as "intelligent pigs," can include a long train of modules that incorporate sensors to measure pipe wall thickness, or pipe joint weld integrity, for example.

During the precommissioning of a pipeline, filtered seawater is often injected into the pipeline to ensure it is completely filled to enable a hydrostatic pressure testing. Following the completion of a hydrostatic testing operation on a pipeline, it may be necessary to execute a dewatering operation to remove any water from the subsea pipeline before oil and or gas is allowed to flow through the pipeline.

In a dewatering operation, at least one dewatering pig is launched from one end of the pipeline and is propelled through the pipeline by pumping compressed gas behind the pig with respect to the direction of the pig's travel. As the pig travels through the pipeline, the pig displaces any liquid from the pipeline.

In deep water pipelines, compressed gas of high pressure and flow rate is required to move the pig through a pipeline due to the weight of the water column ahead of the pig, or the hydrostatic head. Thus, high pressure and volume flow compressors, compressed air boosters, or pumps are needed to drive a dewatering pig or pig train through pipelines having a high hydrostatic head. For example, in a subsea pipeline that extends below the surface to depths of 7000 feet of water, over 3000 pounds per square inch ("psi") of hydrostatic head results within a water-filled pipeline.

Because compressed gas of high pressure and flow rate is required to move the pig through a pipeline to overcome the high hydrostatic head, large surface support vessels, boats, or other platforms are required to support the large equipment required to produce the pressure and volume of compressed gasses and that are pumped into and through the pipeline. These large surface support vessels, boats, or other platforms are expensive in terms of capital equipment, cost of mobilization to site, and the consumption of fuel.

Another disadvantage of the prior art methods of moving a pig through a pipeline is the length of large diameter conduit, coiled tubing, or hose necessary to transfer the gas or fluid from, for example, a platform on the surface to the pig that is to be propelled through a subsea pipeline. Oftentimes, the conduit, coiled tubing, or hose that is used to connect a pipeline to the pumping equipment on the platform becomes tangled or damaged by sea currents, making the dewatering process difficult.

There is a need for a method to move a pig through the pipeline without having to use large pumps or compressors to develop the required large volume of compressed gas to propel the pig. There is also a need for a method to move a pig through the pipeline that does not require large support vessels or platforms to hold such large pumps or compressors. Finally, there is a need for a method to move a pig through a pipeline that does not require a conduit, coiled tubing, or hose that is of great diameter and lengths.

SUMMARY OF THE INVENTION

The invention provides a method of moving a pig through pipeline, the method comprising the steps of: a) introducing the pig into the pipeline; b) causing a chemical reaction between two or more reagents to produce at least one reaction product that would be in a gaseous state at Standard Temperature and Pressure ("STP"), wherein the reagents would be in a non-gaseous state at STP; and c) introducing the gaseous reaction product into the pipeline.

The invention also provides a method of moving a pig through a pipeline, the method comprising the steps of: a) introducing the pig into the pipeline; b) introducing into the pipeline two or more reagents capable of chemically reacting to produce at least one reaction product that would be in a gaseous state at STP, wherein the reagents would be in a non-gaseous state at STP.

While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying figures of the drawing are incorporated into and form a part of the specification to illustrate several examples of the present inventions. These drawings together with the description serve to explain the principles of the inventions. The figures are only for illustrating preferred and alternative examples of how the inventions can be made and used and are not to be construed as limiting the inventions to the illustrated and described examples. The various advantages and features of the present inventions will be apparent from a consideration of the drawing in which.

DETAILED DESCRIPTION OF CURRENTLY MOST PREFERRED EMBODIMENTS AND BEST MODE

Figure 1:
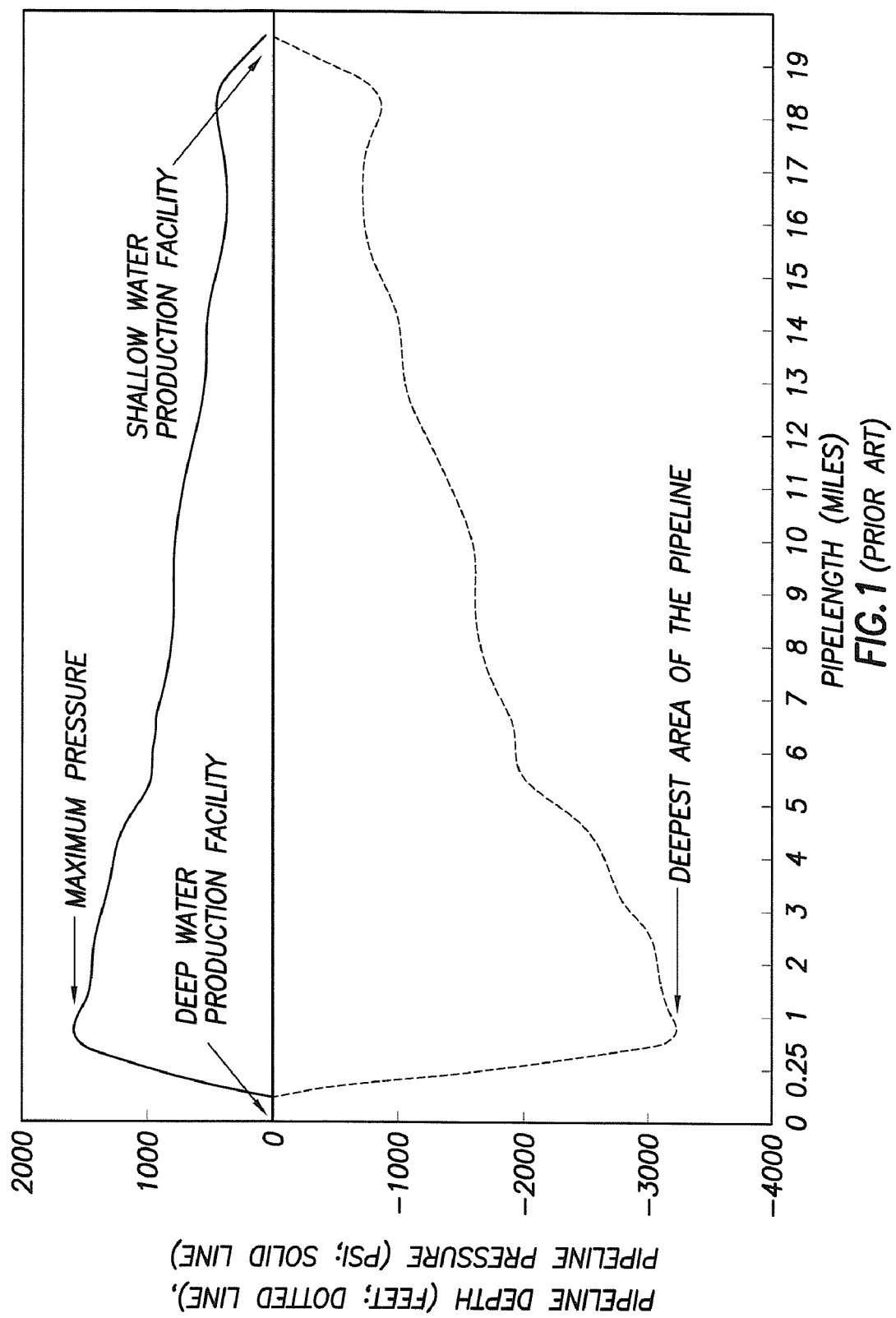
FIG. 1 provides a schematic illustration of a pipeline elevation and dewatering pressure profile versus the pipeline depth, where depth is measured in feet and pressure is measured in psi.

To produce the pressure to move a pig through a pipeline, a chemical reaction is caused between two or more reagents to produce at least one reaction product that would be in a gaseous state at STP, wherein the reagents would be in a non-gaseous state at STP. This gaseous reaction product from the chemical reaction is then introduced into the pipeline. The gaseous reaction product from the chemical reaction product advantageously provides a new method of propelling a pig through the pipeline without using a compressor to pump compressed gas into the pipeline. The invention also provides that at least one of the reagents would be in a non-gaseous state at STP, and the stoichiometric number of reaction products that would be in a gaseous state at STP is greater than the stoichiometric number of reagents that would be in a gaseous state at STP. This provides the capacity for at least some volume expansion of the reaction products to the gaseous state relative to the state of the reagents. While the state of the reagents or products may be different under the actual reaction conditions or in the pipeline, the state of the reagents or products is determined at STP as a minimum standard for evaluating the ability to generate an expansion of reagents from a non-gaseous state to a gaseous state. Preferably, the reaction product or products would be in a gaseous state at the temperature and pressure conditions within the pipeline adjacent the front of the pig.

One example of chemical reaction to produce a gaseous reaction product to move the pig is a chemical reaction of sodium nitrite and ammonium chloride. Preferably, the reaction is catalyzed with acid. The reaction generates nitrogen gas that is used to move the pig through the pipeline. Other chemical reactions that can be used in the invention are described in U.S. Pat. Nos. 4,755,230; 5,183,581; and 5,639,313, herein incorporated fully by reference in their entirety. In particular, U.S. Pat. No. 5,183,581 describes a process for dewaxing producing formations by means of a water-in-oil nitrogen generating emulsion system. It should be understood by those skilled in the art that other chemical reactions that can produce a gaseous reaction product can be used in the invention to move the pig through the pipeline.

The amount of chemical reagents that will be required to react and produce the gaseous reaction product that will provide a sufficient volume and pressure of gas to the pipeline in order to move the pig through the pipeline will be determined by the pipeline profile. The pipeline profile includes the pipeline's length, depth, and diameter. The amount of chemical reagents that will be required to react and produce the gaseous reaction product will also be determined by the desired speed that the pig is to be moved through the pipeline. Preferably, the amount of chemical reagents used in the invention is sufficient to move the pig at a rate of between one and three feet per second, although other rates are possible. The chemical reaction can be controlled to generate a sufficient amount of gaseous product to substantially reduce the hydrostatic head in front of the direction of travel of the pig.

Turning initially to FIG. 1, illustrated is a pipeline elevation and dewatering pressure profile versus the pipeline depth. The y-axis defines the length of the subsea pipeline, measured in miles. The x-axis below zero defines the depth of the pipeline below the sea surface, measured in feet. The x-axis above zero defines the pressure required to move the pig for the corresponding depth of the pipeline, measured in psi.

As indicated, the maximum dewatering pressure in the pipeline occurs at the deepest area of the pipeline, indicated at approximately 3,250 feet below the sea's surface. At this depth of the pipeline, the dewatering pressure is at the maximum pressure, indicated at 1,492 psi.

Figure 2:
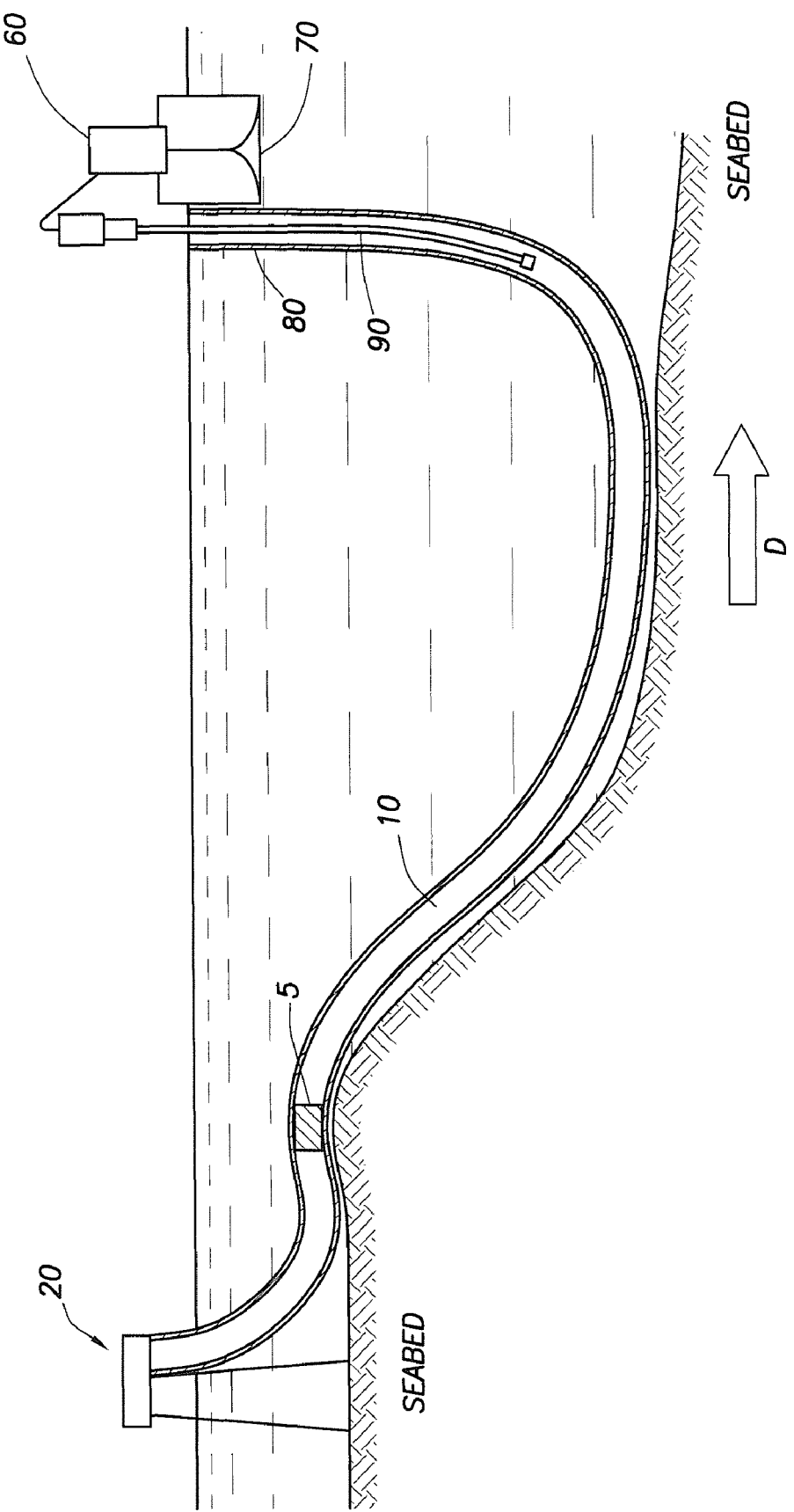
FIG. 2 provides a schematic illustration of one aspect of the invention where a pig has been introduced into a pipeline that extends from a production platform to a floating production facility.

Turning now to FIG. 2, a schematic of one aspect of the invention is illustrated where a pig 5 has been introduced into a pipeline 10 that extends from a production platform 20 to a floating production facility 70.

The chemical reagents for use in the invention can be stored in a vessel 60. To control the reaction, the rate of mixing of the reagents and/or the catalyst can be controlled. The chemical reagents react within the vessel 60 to produce the gaseous reaction product for use in the invention. The vessel can be supported on any surface platform, such as the floating production facility 70. The vessel 60 is of a size necessary to sustain the chemical reaction within the vessel 60. Thus, large pumps or compressors used to pump compressed gas as in the prior art are not necessary in the invention. Further, large surface support vessels, boats, or other platforms that were required to support the large pumps or compressors of the prior art are not necessary to support the vessel 60. The vessel 60 can comprise of a means to measure or control the flow of gaseous reaction product admitted into the vessel 60. The vessel 60 can also comprise an isolating valve (not shown) to close off the flow of gaseous reaction product through the vessel 60. The isolating valve of the vessel 60 can be made to be operated remotely or by the intervention of a remotely operated vehicle.

The gaseous reaction product is transferred into the pipeline 10 by an inlet conduit 90 that is in fluid communication with the pipeline 10. Like the vessel 60, the inlet conduit 90 can also comprise of a means to measure or control the flow of gaseous reaction product admitted into the inlet conduit 90. Further, the vessel 60 can comprise an isolating valve (not shown) to close off the flow of gaseous reaction product through the inlet conduit 90. Also like the vessel 60, the isolating valve of the vessel 60 can be made to be operated remotely or by the intervention of a remotely operated vehicle.

Figure 3:
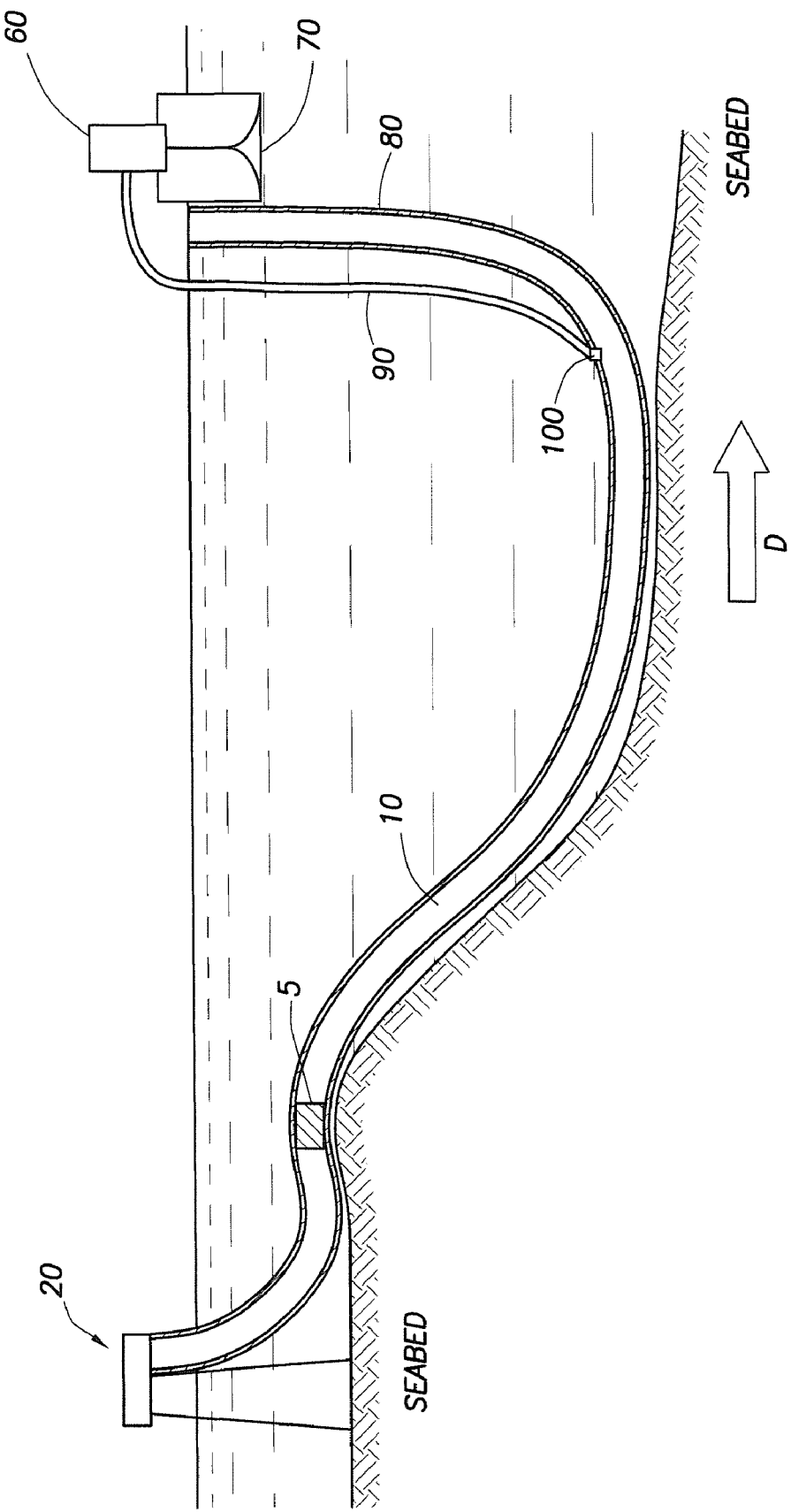
FIG. 3 provides a schematic illustration of one aspect of the invention, where the inlet conduit can pass through the exterior of the pipeline, as opposed to the interior of the pipeline shown in FIG. 2.

As illustrated in FIG. 3. An an inlet port 100 can be positioned on the pipeline wall to provide a coupling between the inlet conduit 90 and the pipeline 10. The inlet conduit 90 can be adapted to be coupled underwater to the inlet port 100 by a diver or remotely operated vehicle.

The inlet conduit 90 need not pass through the interior of the pipeline 10 as shown in FIG. 2. The inlet conduit 90 can also pass through the exterior of the pipeline 10 as shown in FIG. 3.

Figure 4:
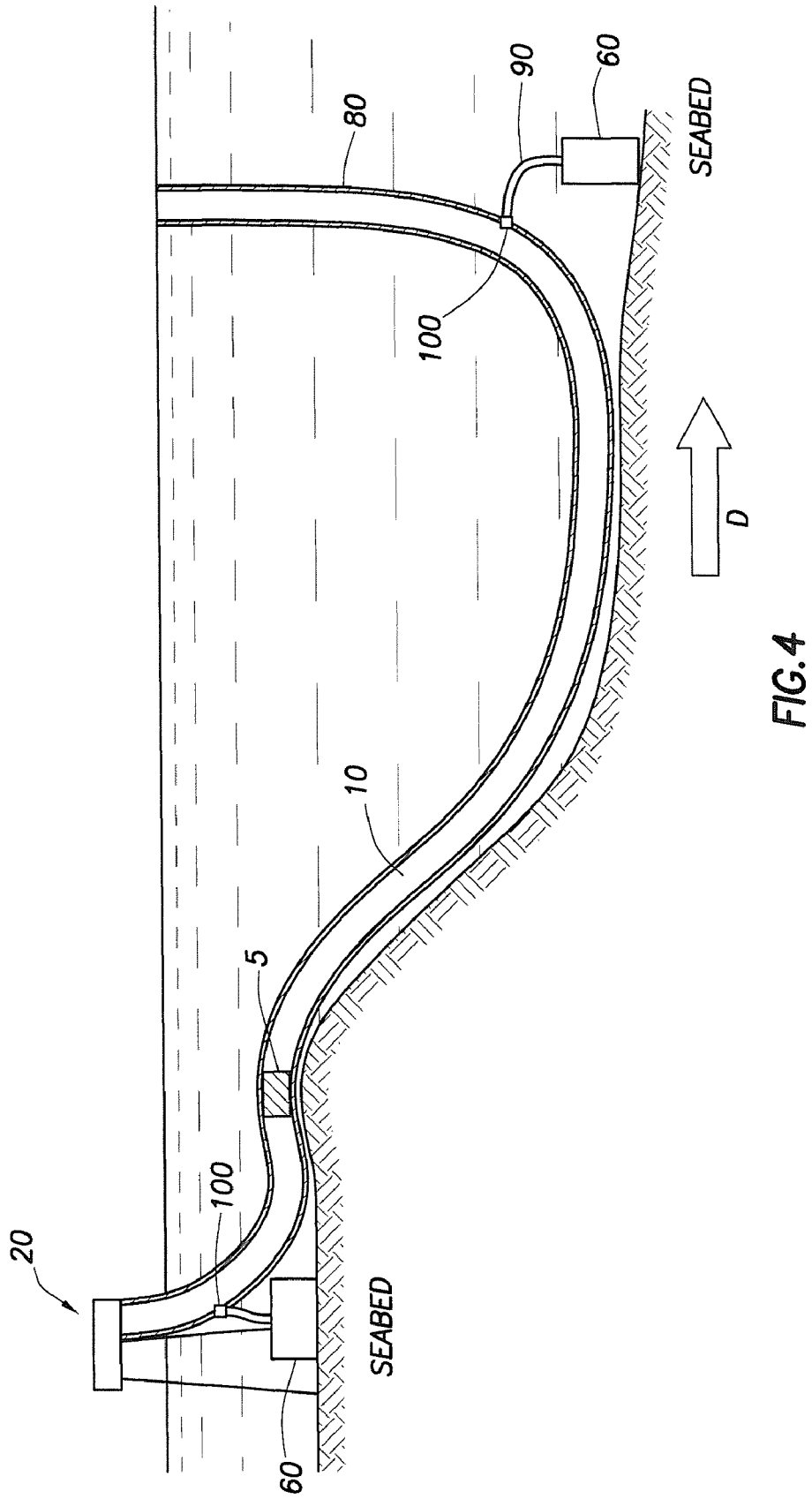
FIG. 4 provides a schematic illustration of a third aspect of the invention where the vessel is placed on the seabed and connects to the pipeline through an inlet conduit.
Figure 5:
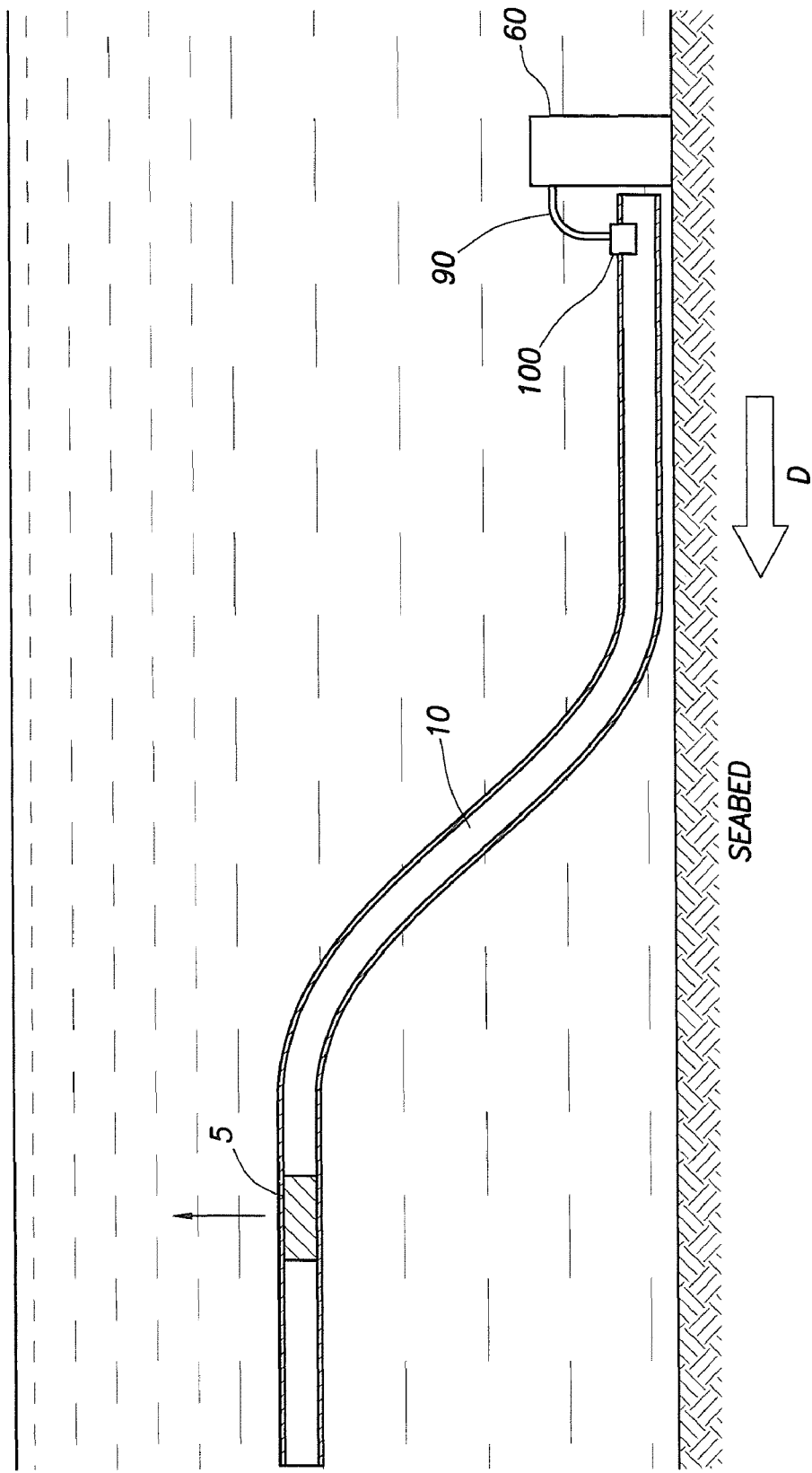
FIG. 5 provides a schematic illustration of the pig that moves in a pipeline where both ends of the pipeline are submerged in seawater.

As mentioned previously, the vessel 60 can be positioned on a floating production facility 70. Alternatively, for example, the vessel 60 can be positioned on the seabed, preferably near the pipeline 10. Turning now to FIGS. 4 and 5, illustrated is a schematic illustration of a third aspect of the invention where the vessel 60 is placed on the seabed and connects to the pipeline 10 through an inlet conduit 90. The gaseous reaction product is transported to the pipeline 10 by the inlet conduit 90 that extends from the vessel 60 to the inlet port 100. The direction D of the pig 5 is indicated by the arrow.

Turning now to FIG. 5, a schematic illustrates the pig 5 that moves in the pipeline 10 where both ends of the pipeline are submerged in seawater. The vessel 60 containing the chemical reagents is positioned on the seabed. The reagents are reacted within the vessel 60. The gaseous reaction product from the chemical reaction is then transferred via the inlet conduit 80 into the pipeline 10. The inlet port 100 provides a coupling from the inlet conduit 80 to the pipeline 10. The gaseous reaction product that is produced from the chemical reaction provides a means to drive the pig 5 upstream from one end to the other end of the pipeline 10 in direction D. When the gaseous reaction product is transferred to a remote end of the pipeline, (opposite to the location of the dewatering pig 5), the gaseous reaction product replaces part of the water column with gas (known as gas lift), this reduces the pressure required to drive the pig 5 through the pipeline 10. Preferably, the gaseous reaction product is transferred to the deeper end of the pipeline 10 to apply the gas lift in the area of the pipeline with the higher hydrostatic pressure. For instance, if a riser is used on one end of the pipeline 10, the gaseous reaction product can be transferred to the bottom of the riser, and in doing so, gas lifting the fluid column within the riser which in turn reduces the pressure and volume of gas required to drive the pig 5 through the pipeline 10.

It should be understood by those skilled in the art that the gaseous reaction product from the chemical reaction that takes place in the vessel 60 can be transferred to the back, front, or both sides of the pig 5 with respect to the direction of travel of the pig 5.

In another aspect of the invention, two or more reagents capable of chemically reacting are introduced into the pipeline to produce at least one reaction product that is in a gaseous state at STP, wherein the reagents are in a non-gaseous state at STP. The invention also provides that at least one of the reagents would be in a non-gaseous state at STP, and the stoichiometric number of reaction products that would be in a gaseous state at STP is greater than the stoichiometric number of reagents that would be in a gaseous state at STP. Thus, the chemical reagents are stored on the surface platform 70 and delivered to the pipeline through an inlet conduit, where they react in the pipeline and release a gaseous reaction product that provides the pressure necessary to move the pig 5 forward in the pipeline 10.

As readily understood by those skilled in the art, the pipeline 10 can include an inlet riser and an outlet riser that each extend to the water surface. Also readily understood by those skilled in the art is that the pig 5 need not only be transferred between a production platform and a floating production facility as illustrated in this embodiment, rather the pig 5 can be transferred between any platform, terrestrial or maritime terminal, or monobuoy. Further, the pig 5 can be a pig train such that multiple pigs are within the pipeline 10.

Advantageously, the inlet conduit 90 need not be of a large diameter to transfer the chemical reagents to the pipeline 10, as in prior art methods that require larger diameter inlet conduits to deliver compressed gas. In this way, the inlet conduit 90 that is used to transfer chemical reagents to the pipeline 10 is less bulky and less likely to become tangled or damaged by sea currents.

It should also be understood by those skilled in the art that the method according to the invention is applicable in any subsea pipeline that must be dewatered or have liquids replaced by gas. Some applications of the invention include, but are not limited to, pipelines where both ends of the pipeline are submerged in water; pipelines between a shallow water platform and a deep water production facility; pipelines between a shore facility and a deep water production facility; pipelines between a shore facility and a shallow water production facility; pipelines between a subsea deep water template and a surface production facility; and pipelines between two surface facilities in deep water with interconnecting pipelines. In addition to subsea pipelines, the methods according to the invention can also be applied to subterranean pipelines.

After careful consideration of the specific and exemplary embodiments of the invention described, a person of ordinary skill in the art will appreciate that certain modifications, substitutions and other changes can be made without substantially deviating from the principles of the invention. The detailed description is illustrative, the spirit and scope of the invention being limited only by the appended claims.

What is claimed is:

1. A method of moving a pig through a pipeline, the method comprising the steps of:
   a. introducing the pig into the pipeline, wherein the pipeline contains water or other liquid;
   b. causing a chemical reaction between two or more reagents to produce at least one reaction product that would be in a gaseous state at STP, wherein the reagents would be in a non-gaseous state at STP; and
   c. transferring the gaseous reaction product into the pipeline behind the pig with respect to a direction of travel of the pig;
   wherein the chemical reaction is controlled to generate a sufficient amount of gaseous product to move the pig and to replace the water or other liquid in the pipeline with gas.

2. The method according to claim 1, wherein the reaction product would be in a gaseous state at temperature and pressure conditions within the pipeline adjacent a front of the pig.

3. The method according to claim 1, wherein the step of causing a chemical reaction further comprises the step of using a catalyst to facilitate the reaction between the two or more reagents.

4. The method according to claim 3, wherein the reagents comprise sodium nitrite and ammonium chloride, and the catalyst comprises an acid.

5. The method according to claim 4, wherein the gaseous reaction product comprises nitrogen.

6. The method according to claim 1, wherein the step of causing a chemical reaction comprises causing a chemical reaction within a reaction vessel.

7. The method according to claim 6, further comprising the step of positioning the reaction vessel on a seabed.

8. The method according to claim 6, further comprising the step of introducing transferring the gaseous reaction product into an inlet conduit that is in fluid communication with the pipeline, wherein the inlet conduit extends from the reaction vessel to an inlet port on the pipeline.

9. The method according to claim 1, wherein the gaseous reaction product is transferred into the pipeline both in front of the pig and behind the pig with respect to a direction of travel of the pig.

10. The method according to claim 9, wherein the chemical reaction is controlled to generate a sufficient amount of gaseous product to substantially reduce a hydrostatic head in front of the direction of travel of the pig.

11. The method according to claim 1, wherein the chemical reaction is controlled to generate a sufficient amount of gaseous product to move the pig at a rate of between one and three feet per second.

12. The method according to claim 1, where the chemical reaction is controlled by controlling reaction conditions between the two or more reagents.

13. The method according to claim 12, wherein controlling the reaction conditions includes controlling a mixing rate of the reagents.

14. The method according to claim 1, further comprising the step of providing a subsea pipeline comprising a first end and a second end, wherein at least one end is submerged in a sea.

15. The method according to claim 14, wherein at least one end comprises a riser that extends to a surface of the sea.

16. The method according to claim 1, wherein a pig train comprises the pig.

17. The method according to claim 14, wherein the first end and the second end are submerged in the sea.

18. The method according to claim 14, wherein the first end and the second end are located at different depths, whereby a hydrostatic head would result between the ends of the pipeline containing the water or other liquid.

19. The method according to claim 1, wherein the pipeline is between a subsea well or template and a product-receiving host facility.

20. The method according to claim 19, further comprising the step of filling the pipeline with water to enable a hydrostatic pressure testing prior to the step of causing the chemical reaction.

* * * * *